July 14, 1970  C. O. STIDHAM ET AL  3,520,026
RUNNER SYSTEM HAVING RESISTANCE HEATED COMPONENTS
Filed Feb. 12, 1968  2 Sheets-Sheet 1

INVENTORS
C. W. OSBORN
C. O. STIDHAM
BY
Young + Quigg
ATTORNEYS

INVENTORS
C. W. OSBORN
C. O. STIDHAM

BY *Young & Quigg*

ATTORNEYS

3,520,026

RUNNER SYSTEM HAVING RESISTANCE HEATED COMPONENTS

Charles O. Stidham and Charles W. Osborn, Bartlesville, Okla., assignors to Phillips Petroleum Company, a corporation of Delaware
Filed Feb. 12, 1968, Ser. No. 704,648
Int. Cl. B29f 1/08
U.S. Cl. 18—30     3 Claims

ABSTRACT OF THE DISCLOSURE

A runner system for multi-gated molds is heated by utilizing certain components of the system such as a torpedo in the sprue area or the runner block itself as resistance heated elements.

BACKGROUND OF THE INVENTION

This invention relates to heated runner systems for molds used in injection molding operations.

With multi-cavity and/or multi-gated molds, it is necessary to provide a channel within the mold to carry the molten plastic from the nozzle of the injection molding machine to the gates in the cavity or cavities.

Initially three-plate molds were used. With a three-plate mold, the runner is removed from the mold with each shot. This involves an extra step and thus is not a desirable arrangement for high speed molding operations. A second runner system known to the prior art is the insulated runner. The insulated runner mold uses a large diameter runner with no heaters of any type. A portion of the polymer solidifies around the periphery of the channel in this runner and provides the insulation so that the material in the center of the channel can remain molten. Such runner systems are used extensively but they suffer from certain disadvantages. For instance, it is difficult to control the temperature accurately and therefore the operation frequently results in the production of drool at the gate or else freezing off at the gate. In a variation of the insulated runner, a heater is used either around the sprue bushing or else a torpedo is utilized within the sprue area, and this torpedo is heated with a cartridge heater.

A third type of runner system is the hot runner block. With the hot runner block a relatively large runner block having a small diameter runner is utilized. Holes are drilled in the runner block and cartridge heaters are used to heat the block. While this system is utilized extensively on a commercial scale at the present time, it suffers from numerous deficiencies. For one thing it necessitates heating an entire, relatively large, runner block. Also there are numerous problems during start-up; there is a problem of inducing warpage in the mold or burning out insulating O-rings and the like. Also cartridge heaters tend to burn out after extended periods of use and their removal and replacement is frequently quite difficult.

SUMMARY OF THE INVENTION

It is an object of this invention to provide an improved hot runner system; it is a further object of this invention to provide a hot runner system characterized by even heating; it is a still further object of this invention to provide a hot runner system wherein drool and freezeoff are substantially eliminated; it is yet a further object of this invention to alleviate maintenance problems normally associated with hot runner systems; it is yet a further object of this invention to allow more efficient use of the heat energy input into a hot runner system; and it is yet a further object of this invention to provide an insulated runner system having improved heaters.

In accordance with this invention, a runner system is heated by utilizing certain components of said system as resistance heated elements, thus providing direct contact between the polymer and the resistance heated element.

BRIEF DESCRIPTION OF THE DRAWINGS

In the drawings, forming a part hereof, in which like parts are designated by like reference characters in the various views.

DESCRIPTION OF THE PREFERRED EMBODIMENTS

The instant invention is applicable to any type of molding operation utilizing a runner system for conveying molten polymer. For instance it is of particular utility in injection molding machines being utilized to mold thermoplastic materials such as olefin polymers, polyvinyl chloride, nylon, polystyrene, and the like.

The resistance heated torpedo of this invention can be used in either an insulated runner system or a hot runner system. Similarly, the hot runner can be used either with or without a torpedo in the sprue area.

Either a direct current or alternating current can be used in the practice of this invention.

Figure 1:
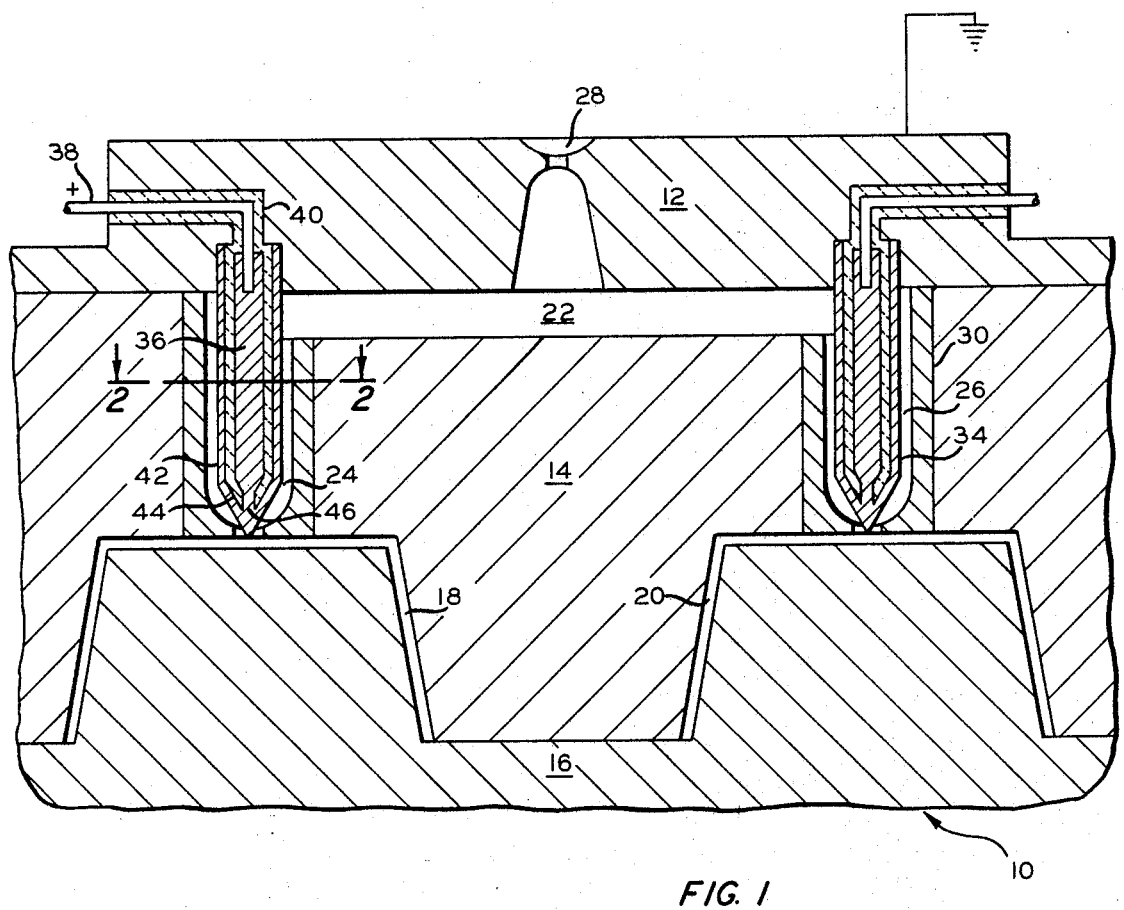
FIG. 1 is a cross section of an insulated runner system using resistance heated torpedoes in the sprue area.
Figure 2:
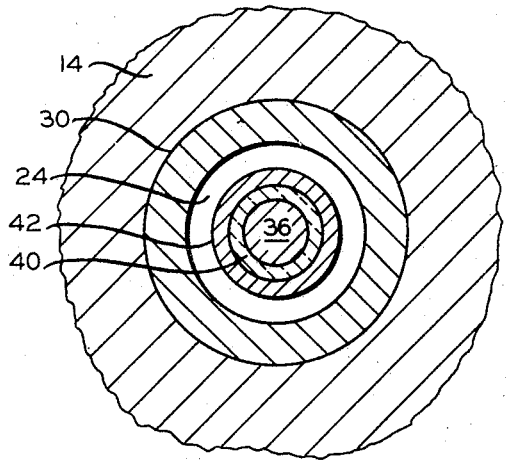
FIG. 2 is a cross section along section lines 2—2 of FIG. 1, enlarged for the purpose of clarity.

Referring now to the drawings, particularly FIGS. 1 and 2, there is shown an insulated runner system having a resistance heated torpedo in the sprue area. The mold assembly designated by reference character 10 comprises clamp plate or platen 12, cavity section 14, and core section 16. Cavity section 14 and core section 16 cooperate to form mold cavities 18 and 20. Insulated runner 22 has down-turned legs 24 and 26. Polymer is injected into this runner system from an injection molding machine (not shown) via sprue 28.

The down-turned legs 24 and 26, can conveniently be constructed as bushings 30, as illustrated, or can be an integral part of the cavity section. Within down-turned legs 24 and 26 are resistance heated torpedoes 34.

Referring now to FIG. 1 and FIG. 2 the construction of resistance heated torpedo 34 will be described in detail. The core 36 of torpedo 34 is connected to a positive electrical terminal 38. Surrounding core 36 is annular insulator 40. Insulator 40 insulates positive electrical terminal 38 from clamp plate 12 and also insulates core 36 from annular sleeve 42. Annular sleeve 42 is in contact with clamp plate 12 and hence with ground. Annular insulator 40 tapers to an inverted frusto conical section 44 near the bottom of torpedo 34, said insulator having an opening 46 at the lowermost portion thereof. This opening 46 provides a connection between core 36 and annular sleeve 42. Thus a complete electrical circuit is formed, the current being able to flow through positive electrical terminal 38 thence through core 36, thereafter through opening 46 and then back up along annular sleeve 42, and then on to ground through clamp plate 12. Annular sleeve 42, being relatively thin, and preferably made of a high resistance material such as Nichrome is heated by the passage of current therethrough. Positive electrical terminal 38, being made of a low resistance material such as copper and core 36 being of large cross section and/or of a low resistance material are not heated appreciably by the passage of electrical current. Thus through this novel and unique arrangement it is possible to selectively heat the skin of resistance heated torpedo 34. This enables the generation of sufficient heat to heat the thermoplastic material molten without utilizing extremely high voltages or extremely high currents.

The core 36 can be made of a high resistivity material similar to or identical to that of the annular sleeve 42 since it is larger in cross section and thus will not heat up appreciably or it can be made of any conductive material and only the annular sleeve made of a material having a relatively high resistivity. Preferably the resistivity of the material forming annular sleeve 42 is between 10 and 200, preferably between 50 and 150 microhms per centimeter cube (measured at 20° C.). Nichrome (registered trademark) has a resistivity of 100 microhms per centimeter cube measured at 20° C. Nichrome is preferred but other materials such as high resistivity metals such as stainless steel, can also be used. Insulator 40 can be comprised of any electrical insulating material which will withstand the high temperatures involved. Suitable materials include ceramic, asbestos, Formica (trademark), glass, and the like.

Figure 3:
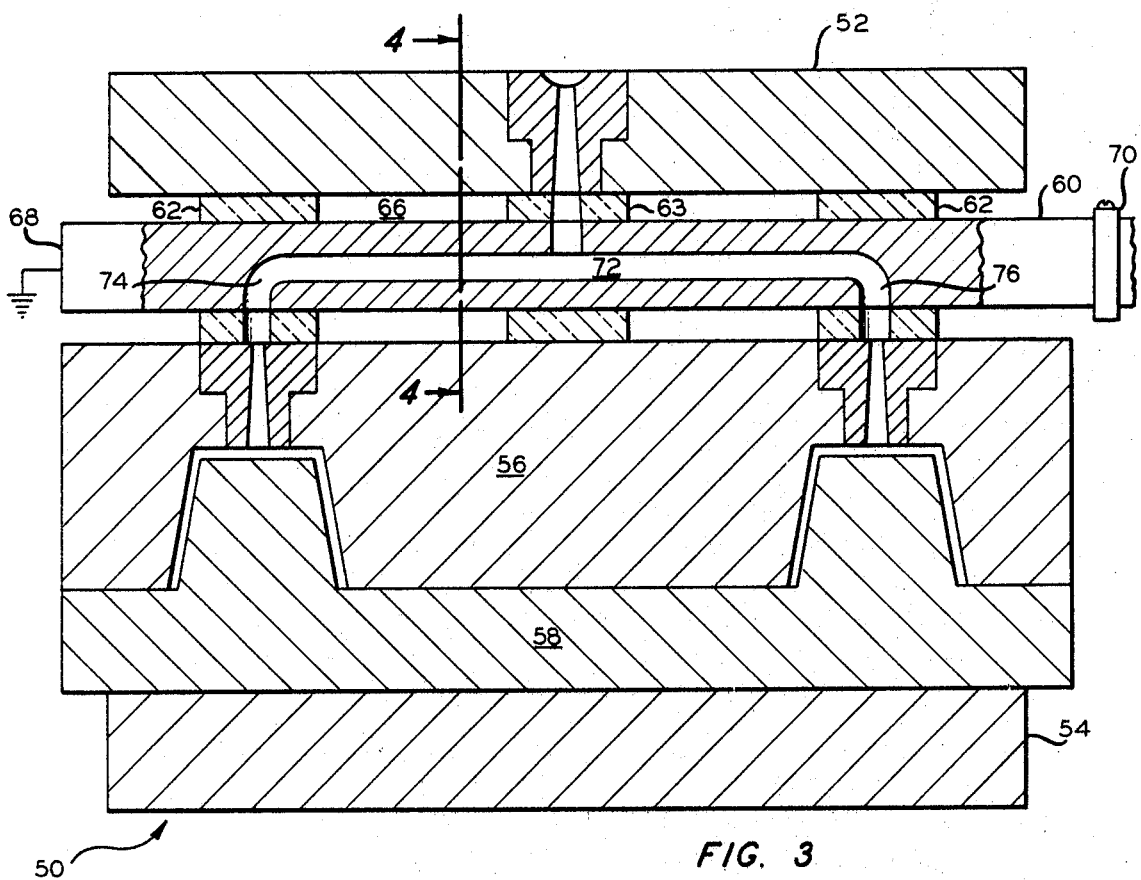
FIG. 3 is a cross section of a hot runner system utilizing a resistance heated runner block.
Figure 4:
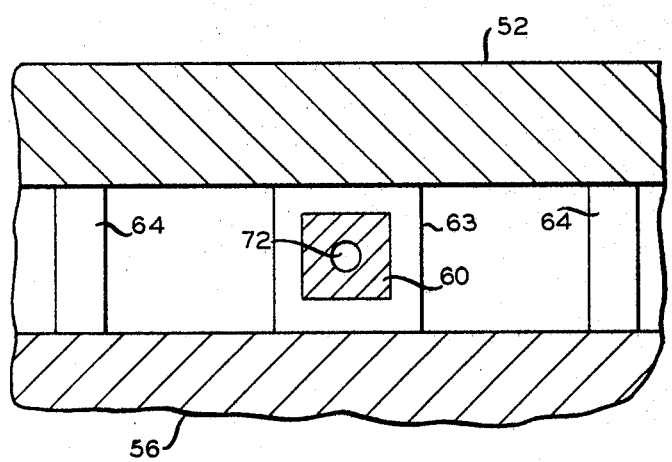
FIG. 4 is a cross section along section lines 4—4 of FIG. 3.

Referring now to FIGS. 3 and 4, there is shown another embodiment of this invention wherein the runner block itself serves as a resistance heated element. The mold assembly is designated by reference character 50. This mold assembly comprises upper mold mounting plate 52, lower mold mounting plate 54, cavity section 56, and core section 58. Runner block 60 is held between upper mold mounting plate 52 and cavity section 56 by means of spacer-insulators 62. Spacer-insulator 62 and stand-offs 64 (FIG. 4) position cavity section 56 in a spaced apart relationship to upper mold mounting plate 52. Spacer-insulators 62 and 63 hold runner block 60 in a spaced apart relationship from both upper mold mounting plate 52 and cavity section 56; in the areas not having insulators, air gap 66 separates heated runner block 60 from mold mounting plate 52 and cavity section 56 so as to prevent heat loss into these components. Since runner block 60 is separated from mold mounting plate 52, cavity section 56, and other components of the mold assembly by spacers 62 and 63, and air gap 66, electrical current can flow the length of this block without being shorted through the mold assembly. End 68 of runner block 60 is connected to ground. Positive voltage is impressed upon this block through sliding terminal 70. Insulators 62 and 63 can be comprised of any electrical insulating material which is capable of withstanding the temperatures and pressures involved. Suitable materials include ceramic, asbestos, Formica (trademark), glass, and the like. Runner block 60 can comprise any high resistivity material such as is described in connection with annular sleeve 42. The temperature can be controlled either by varying the current or voltage. Alternatively, at a constant voltage, the temperature can be adjusted to a fine point by sliding terminal 70 to the left or right along runner block 60. If it is not desired to control the temperature by sliding terminal 70, then of course runner block 60 can terminate at a point just beyond the last portion of the runner and the electrical terminal can be stationary as opposed to sliding. Within runner block 60 is runner 72 having down-turned legs 74 and 76.

Runner block 60 can be made of the same type of material as sleeve 42 such as Nichrome which is preferred, or other materials, such as high resistance metals such as stainless steel.

The novel and unique resistance heated runner systems of the instant invention offer numerous advantages over the system of the prior art. For one thing the heating is inherently uniform throughout the runner block or in the case of the heated torpedo throughout the surface of the torpedo, whereas with the heated runner systems of the prior art hot spots inevitably form around the areas immediately adjacent the heaters. Also the temperature can be controlled more precisely utilizing the instant invention. When utilizing cartridge or band heaters it is necessary to employ a thermocouple and a temperature controller in order to turn the heating elements on and off in response to the temperature of the block. This results in a cyclic temperature variation which is undesirable. However using the instant invention the current can be set to the proper level to achieve the heating desired and the block will simply remain at any given temperature. Also by using the sliding terminal as disclosed in connection with FIG. 3, it is possible to control very closely the temperature settings. In addition, there is less wasted heat; the runner block of the instant invention is small compared with runner blocks of the prior art because there is no need for a space for heater bands or cartridges.

With particular reference to the resistance heated torpedo, opening 46 can be made of the proper cross section so as to have the same resistance as the cross section of annular sleeve 42 so as to achieve even heating at the bottom as well as along the sides of the torpedo. By utilizing the instant invention the gate area can be made smaller so as to prevent drool, and yet because of the close temperature control which is possible, freezeup will not occur.

Another advantage of the instant invention is that because of the small size of the runner block, air gapping can be greatly simplified and thus prevent excessive heat buildup in other parts of the mold.

Low voltage electrical current can be utilized to heat the resistance heated runner elements of the instant invention, thus reducing electrical hazards when operating in accordance with the instant invention.

Many conventional parts have been eliminated from the drawing for the sake of simplicity, but their inclusion is understood by those skilled in the art and is within the scope of the invention.

EXAMPLE

A mold assembly similar to that shown in FIG. 3 is equipped with a runner block made of a 36 inch long section of Nichrome tubing having an inside diameter of ⅜ inch and a wall thickness of 100 mils. A voltage of 3.16 volts is impressed across this block. Polymer at a temperature of 500–550° F. is injected into this runner block. A direct current of 262 amperes is drawn and the block heats to a temperature of 500 to 550° F. keeping the polymer at the same temperature during its travel from the nozzle of the mold cavity. No drool or freezeup is encountered.

While this invention has been described in detail for the purpose of illustration, it is not to be construed as limited thereby but is intended to cover all changes and modifications within the spirit and scope thereof.

We claim:
1. Mold apparatus comprising in combination: (1) a core section and a cavity section defining at least one mold cavity; (2) a plurality of gates; (3) a runner means connecting said gates; (4) at least one torpedo centrally disposed within at least a portion of said runner means, said torpedo comprising a central core of electrically conductive material having a first electrical connection at a first end thereof; an annular insulator surrounding said core, said core and said insulator tapering to an inverted frusto-conical shape at a second end of said core, said insulator having a hole at this tapered end; and an annular sleeve comprising a material susceptible of being resistance heated by the passage of electric current therethrough, said sleeve enclosing said annular insulator and being in electrical connection with said core through said hole and having, at a spaced apart surface thereof, a second electrical con- nection so as to complete an electrical circuit; and (5) means to pass sufficient electric current through said torpedo to heat at least the surface of said torpedo.

2. An apparatus according to claim 1 wherein said torpedo is comprised of a material having a resistivity of between 50 and 150 microhms per centimeter cube.

3. An apparatus according to claim 1 wherein said torpedo is comprised of Nichrome.

References Cited

UNITED STATES PATENTS

| | | |
|---|---|---|
| 2,390,266 | 12/1945 | Novotny. |
| 2,471,683 | 5/1949 | Halbach. |
| 3,055,055 | 9/1962 | Cook et al. |
| 3,093,865 | 6/1963 | Peters et al. |
| 3,182,356 | 5/1965 | Witkowski. |
| 3,189,948 | 6/1965 | Whitney. |

FOREIGN PATENTS

| | | |
|---|---|---|
| 658,976 | 3/1963 | Canada. |
| 433,707 | 9/1967 | Switzerland. |

ROBERT F. WHITE, Primary Examiner

R. R. KUCIA, Assistant Examiner

U.S. Cl. X.R.

18—42; 264—329